US012652664B2

(12) United States Patent
Dimou et al.

(10) Patent No.: US 12,652,664 B2
(45) Date of Patent: Jun. 9, 2026

(54) DEFERRED SEMI-PERSISTENT SCHEDULING HYBRID AUTOMATIC REPEAT REQUEST ONTO PHYSICAL UPLINK SHARED CHANNEL

(71) Applicant: QUALCOMM Incorporated, San Diego, CA (US)

(72) Inventors: Konstantinos Dimou, New York City, NY (US); Jae Ho Ryu, San Diego, CA (US); Arvind Vardarajan Santhanam, San Diego, CA (US); Peter Gaal, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 809 days.

(21) Appl. No.: 17/937,919

(22) Filed: Oct. 4, 2022

(65) Prior Publication Data

US 2023/0113343 A1 Apr. 13, 2023

Related U.S. Application Data

(60) Provisional application No. 63/262,297, filed on Oct. 8, 2021.

(51) Int. Cl.
| | |
|---|---|
| *H04W 72/1268* | (2023.01) |
| *H04L 1/1812* | (2023.01) |
| *H04W 72/23* | (2023.01) |

(52) U.S. Cl.
CPC ....... *H04W 72/1268* (2013.01); *H04L 1/1812* (2013.01); *H04W 72/23* (2023.01)

(58) Field of Classification Search
CPC .. H04W 72/1268; H04W 72/23; H04L 1/1812
See application file for complete search history.

(56) References Cited

U.S. PATENT DOCUMENTS

| | | | | |
|---|---|---|---|---|
| 12,028,888 B2 * | 7/2024 | Wang | ................... | H04L 5/0055 |
| 12,484,063 B2 * | 11/2025 | Zhang | .................. | H04L 1/1854 |

(Continued)

FOREIGN PATENT DOCUMENTS

| | | | | |
|---|---|---|---|---|
| WO | WO-2021146702 A1 | 7/2021 | | |
| WO | WO-2022130644 A1 * | 6/2022 | ............ | H04W 72/56 |
| WO | WO-2022130645 A1 * | 6/2022 | ............... | H04L 1/00 |

OTHER PUBLICATIONS

International Search Report and Written Opinion—PCT/US2022/046092—ISA/EPO—Dec. 23, 2022.

(Continued)

*Primary Examiner* — Michael J Moore, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication to multiplex a deferred hybrid automatic repeat request (HARQ) feedback for a semi-persistent scheduling (SPS) downlink communication with a physical uplink shared channel (PUSCH) communication. The UE may transmit, to the base station, the deferred HARQ feedback for the SPS downlink communication multiplexed with the PUSCH communication. Numerous other aspects are described.

30 Claims, 10 Drawing Sheets

400

(56)  References Cited

U.S. PATENT DOCUMENTS

| | | | | |
|---|---|---|---|---|
| 2022/0038218 A1* | 2/2022 | Kim | H04L 1/1854 | |
| 2022/0132536 A1* | 4/2022 | Yang | H04L 1/1812 | |
| 2022/0321277 A1* | 10/2022 | Babaei | H04L 1/1896 | |
| 2023/0021331 A1* | 1/2023 | Dimou | H04L 1/1861 | |
| 2023/0090907 A1* | 3/2023 | Dimou | H04L 5/0055 | 370/336 |
| 2023/0100939 A1* | 3/2023 | Dimou | H04L 1/1854 | 370/329 |
| 2023/0113343 A1* | 4/2023 | Dimou | H04L 5/0044 | 370/329 |
| 2023/0224087 A1* | 7/2023 | Dimou | H04L 1/1812 | 370/329 |
| 2024/0072975 A1* | 2/2024 | Rastegardoost | H04W 72/20 | |
| 2024/0147496 A1* | 5/2024 | Ganesan | H04W 72/232 | |
| 2024/0187141 A1* | 6/2024 | Ying | H04L 1/1854 | |
| 2024/0356677 A1* | 10/2024 | Zhang | H04W 72/0446 | |
| 2025/0007653 A1* | 1/2025 | Yang | H04L 1/1854 | |
| 2025/0007670 A1* | 1/2025 | Yin | H04L 5/0055 | |
| 2025/0132883 A1* | 4/2025 | Kittichokechai | H04L 1/1887 | |

OTHER PUBLICATIONS

Qualcomm Incorporated: "HARQ-ACK Enhancement for IOT and URLLC", 3GPP TSG RAN WG1 #106bis-e, R1-2110178, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, XP052059114, 36 Pages, Section 2.3, Section 3.5, Figures 3, 7.

TCL Communication: "UE Feedback Enhancements for HARQ-ACK", 3GPP TSG RAN WG1 Meeting #103-e, R1-2007789, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020, XP051945293, 6 Pages, Section 2.2, The Whole Document.

* cited by examiner

400

Base Station 110

UE 120

405
Indication to multiplex deferred SPS HARQ feedback with PUSCH

410
SPS downlink communication

415
Defer HARQ feedback for the SPS downlink communication

420
Deferred SPS HARQ feedback multiplexed with PUSCH communication

710 ~ Receive, from a base station, an indication to multiplex a deferred HARQ feedback for an SPS downlink communication with a PUSCH communication 720 ~ Transmit, to the base station, the deferred HARQ feedback for the SPS downlink communication multiplexed with the PUSCH communication

700

810 — Transmit, to a UE, an indication to multiplex a deferred HARQ feedback for an SPS downlink communication with a PUSCH communication 820 — Receive, from the UE, the deferred HARQ feedback for the SPS downlink communication multiplexed with the PUSCH communication

800

DEFERRED SEMI-PERSISTENT SCHEDULING HYBRID AUTOMATIC REPEAT REQUEST ONTO PHYSICAL UPLINK SHARED CHANNEL

CROSS-REFERENCE TO RELATED APPLICATION

This patent application claims priority to U.S. Provisional Patent Application No. 63/262,297, filed on Oct. 8, 2021, titled "DEFERRED SEMI-PERSISTENT SCHEDULING HYBRID AUTOMATIC REPEAT REQUEST ONTO PHYSICAL UPLINK SHARED CHANNEL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for deferring semi-persistent scheduling (SPS) hybrid automatic repeat request (HARQ) feedback onto a physical uplink shared channel (PUSCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a base station, an indication to multiplex a deferred hybrid automatic repeat request (HARQ) feedback for a semi-persistent scheduling (SPS) downlink communication with a physical uplink shared channel (PUSCH) communication. The one or more processors may be configured to transmit, to the base station, the deferred HARQ feedback for the SPS downlink communication multiplexed with the PUSCH communication.

Some aspects described herein relate to a base station for wireless communication. The base station may include a memory and one or more processors coupled to the memory. The one or more processors may be configured to transmit, to a UE, an indication to multiplex a deferred HARQ feedback for an SPS downlink communication with a PUSCH communication. The one or more processors may be configured to receive, from the UE, the deferred HARQ feedback for the SPS downlink communication multiplexed with the PUSCH communication.

Some aspects described herein relate to a method of wireless communication performed by a UE. The method may include receiving, from a base station, an indication to multiplex a deferred HARQ feedback for an SPS downlink communication with a PUSCH communication. The method may include transmitting, to the base station, the deferred HARQ feedback for the SPS downlink communication multiplexed with the PUSCH communication.

Some aspects described herein relate to a method of wireless communication performed by a base station. The method may include transmitting, to a UE, an indication to multiplex a deferred HARQ feedback for an SPS downlink communication with a PUSCH communication. The method may include receiving, from the UE, the deferred HARQ feedback for the SPS downlink communication multiplexed with the PUSCH communication.

Some aspects described herein relate to a non-transitory computer-readable medium that stores a set of instructions for wireless communication by a UE. The set of instructions, when executed by one or more processors of the UE, may cause the UE to receive, from a base station, an indication to multiplex a deferred HARQ feedback for an SPS downlink communication with a PUSCH communication. The set of instructions, when executed by one or more processors of the UE, may cause the UE to transmit, to the base station, the deferred HARQ feedback for the SPS downlink communication multiplexed with the PUSCH communication.

Some aspects described herein relate to a non-transitory computer-readable medium that stores a set of instructions for wireless communication by a base station. The set of instructions, when executed by one or more processors of the base station, may cause the base station to transmit, to a UE, an indication to multiplex a deferred HARQ feedback for an SPS downlink communication with a PUSCH communication. The set of instructions, when executed by one or more processors of the base station, may cause the base station to receive, from the UE, the deferred HARQ feedback for the SPS downlink communication multiplexed with the PUSCH communication.

Some aspects described herein relate to an apparatus for wireless communication. The apparatus may include means for receiving, from a base station, an indication to multiplex a deferred HARQ feedback for an SPS downlink communication with a PUSCH communication. The apparatus may include means for transmitting, to the base station, the deferred HARQ feedback for the SPS downlink communication multiplexed with the PUSCH communication.

Some aspects described herein relate to an apparatus for wireless communication. The apparatus may include means for transmitting, to a UE, an indication to multiplex a deferred HARQ feedback for an SPS downlink communication with a PUSCH communication. The apparatus may include means for receiving, from the UE, the deferred HARQ feedback for the SPS downlink communication multiplexed with the PUSCH communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
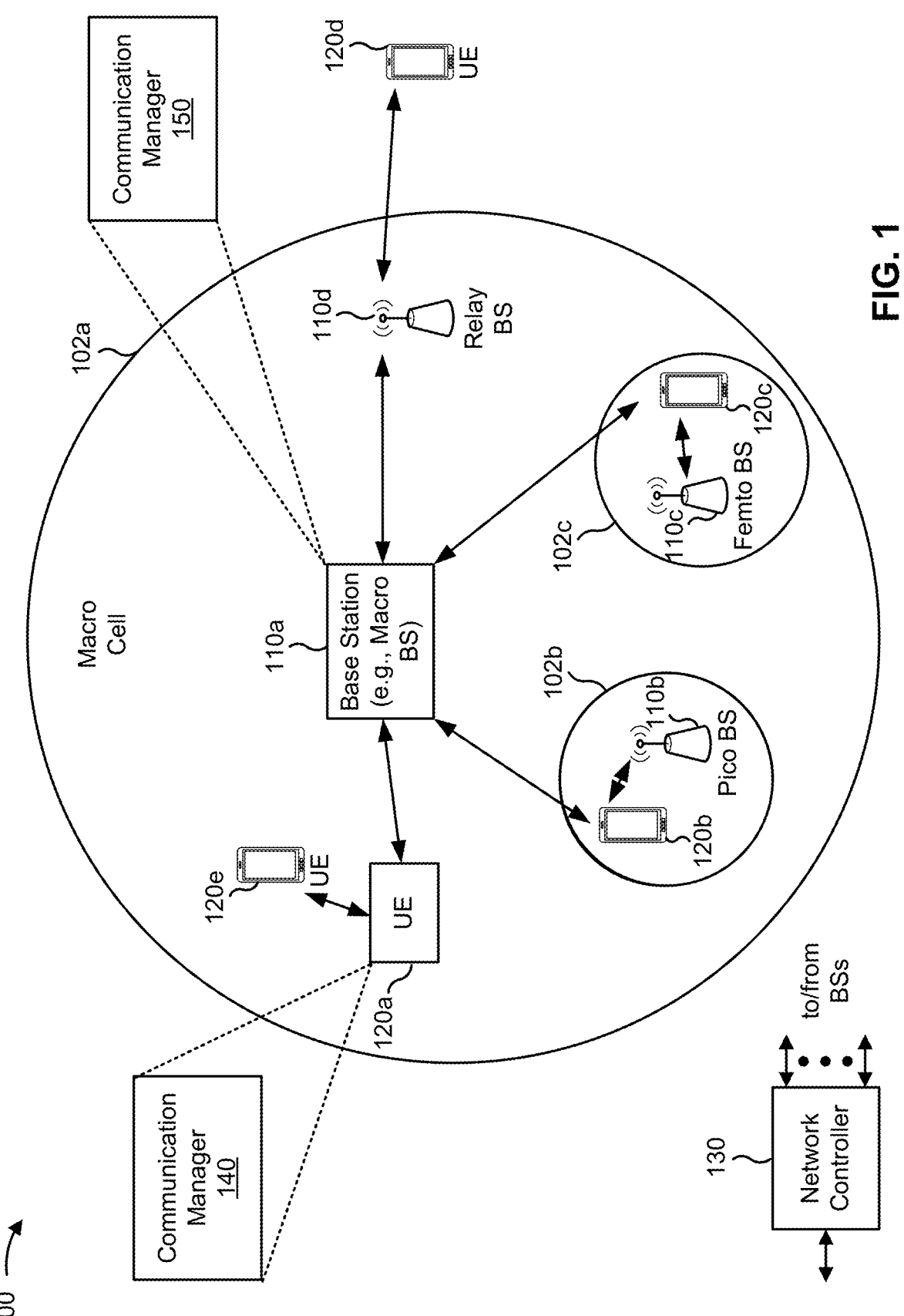
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, an indication to multiplex a deferred hybrid automatic repeat request (HARQ) feedback for a semi-persistent scheduling (SPS) downlink communication with a physical uplink shared channel (PUSCH) communication; and transmit, to the base station, the deferred HARQ feedback for the SPS downlink communication multiplexed with the PUSCH communication. Additionally, or alternatively, the communication manager 140 may perform one or more other operations described herein.

In some aspects, the base station 110 may include a communication manager 150. As described in more detail elsewhere herein, the communication manager 150 may transmit, to a UE, an indication to multiplex a deferred HARQ feedback for an SPS downlink communication with a PUSCH communication; and receive, from the UE, the deferred HARQ feedback for the SPS downlink communication multiplexed with the PUSCH communication. Additionally, or alternatively, the communication manager 150 may perform one or more other operations described herein.

As indicated above, FIG. 1 is provided as an example. Other examples may differ from what is described with regard to FIG. 1.

Figure 2:
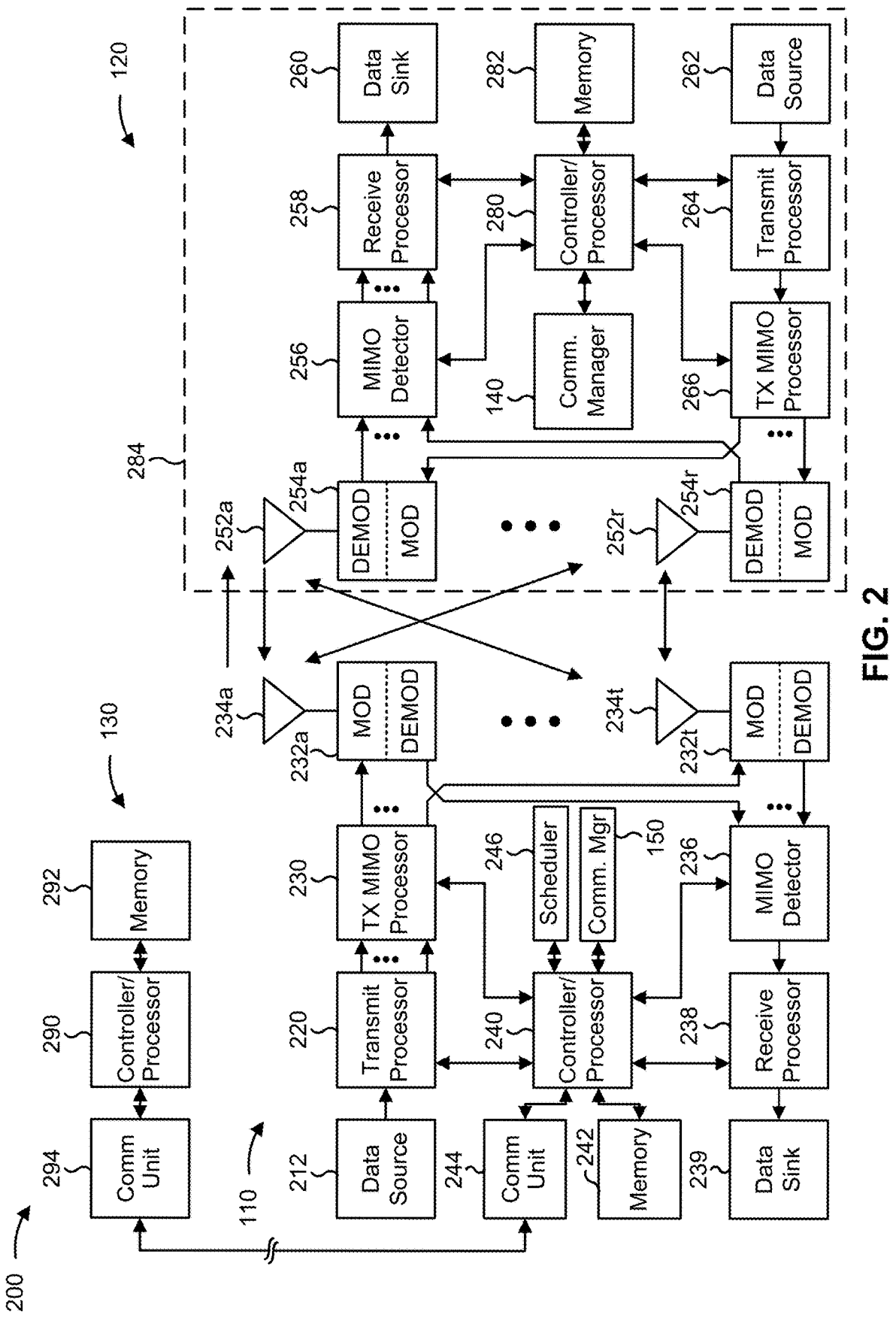
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with deferring SPS HARQ feedback onto a PUSCH, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a base station, an indication to multiplex a deferred HARQ feedback for an SPS downlink communication with a PUSCH communication; and/or means for transmitting, to the base station, the deferred HARQ feedback for the SPS downlink communication multiplexed with the PUSCH communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, an indication to multiplex a deferred HARQ feedback for an SPS downlink communication with a PUSCH communication; and/or means for receiving, from the UE, the deferred HARQ feedback for the SPS downlink communication multiplexed with the PUSCH communication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
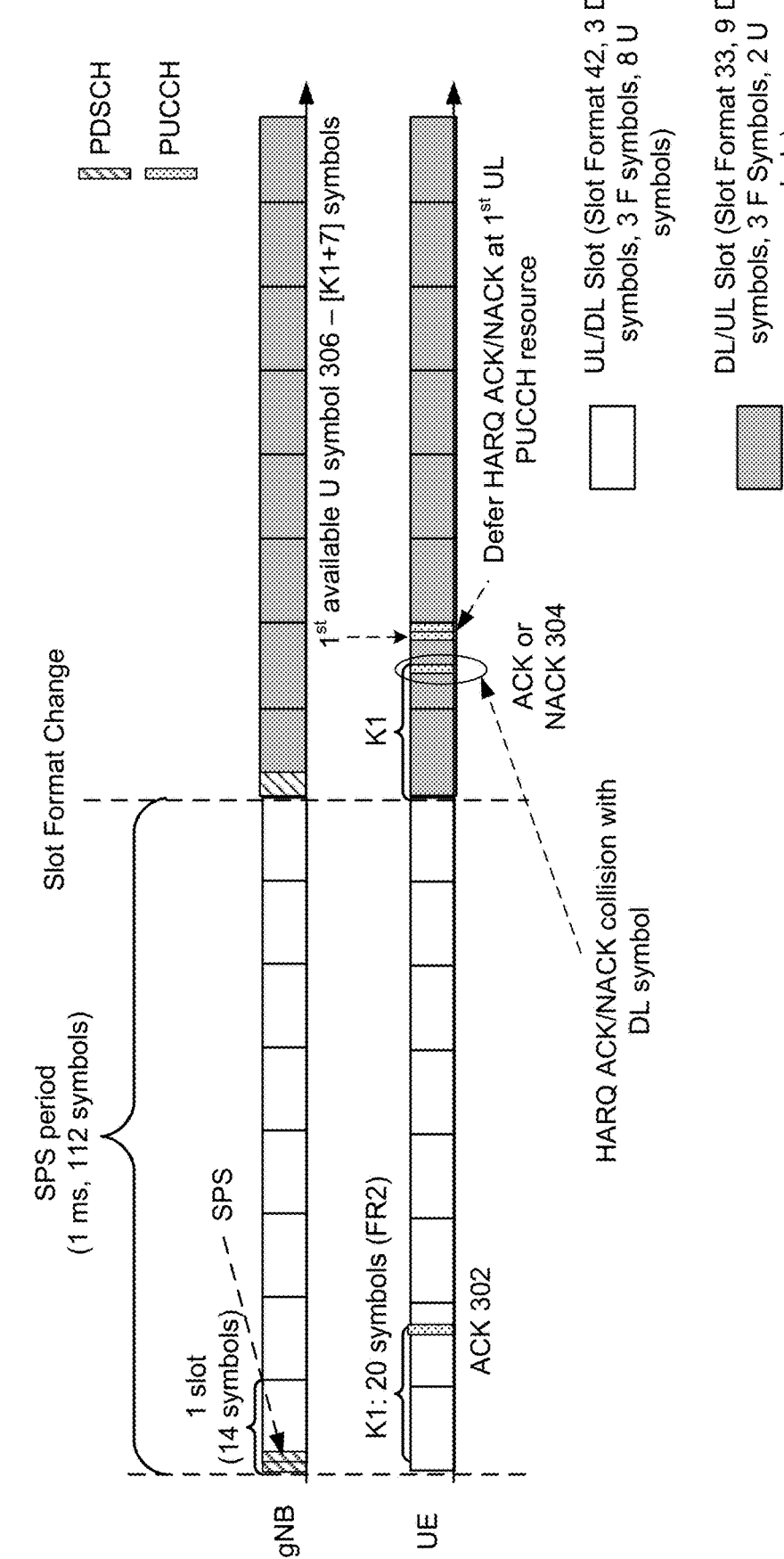
FIG. 3 is a diagram illustrating an example of feedback message collision due to a slot format change, in accordance with the present disclosure.

FIG. 3 is a diagram illustrating an example 300 of a feedback message collision due to a slot format change, in accordance with the present disclosure. Time-frequency resources in a radio access network may be partitioned into resource blocks (RBs), sometimes referred to as physical resource blocks (PRBs) or transport blocks. An RB may include a set of subcarriers (e.g., 12 subcarriers) and a set of symbols (e.g., 14 symbols) that are scheduled by a base station (e.g., a gNB) as a unit. In some examples, an RB may include a set of subcarriers in a single time slot. A single time-frequency resource included in a slot may be referred to as a resource element (RE). An RE may include a single subcarrier (e.g., in frequency) and a single symbol (e.g., in time). A symbol may be referred to as an OFDM symbol.

In some telecommunication systems (e.g., NR), a radio frame may include 10 subframes (or time cycles), each with a length of 1 ms. A subframe may have multiple slots, such as 8 slots (each with a length of 0.125 ms). The number of slots and slot length may vary depending on a numerology used for communications (e.g., a subcarrier spacing (SCS), a cyclic prefix format). A slot may be configured with a link direction (e.g., downlink or uplink) for transmission. In some aspects, the link direction for a slot may be dynamically configured.

A UE may transmit or receive a communication at each symbol of a time slot. Each symbol of the slot may have a communication mode, which may be an uplink communication mode (U), a downlink communication mode (D), a gap symbol (blank), or a flexible symbol (F). A combination of communication modes for a slot may be referred to as a "slot format," which may be identified with a slot format indicator (SFI). For example, 3 shows 8 slots of a first subframe, where each slot (in slot format 42) includes 3 D symbols, 3 F symbols, and 8 U symbols. After a slot format change, caused by receiving a radio resource control (RRC) message (e.g., including a SlotFormatCombinationsPerCell information element (IE) that indicates a slot format with corresponding pattern of symbols) or a new SFI in a physical downlink control channel (PDCCH), each slot in the next subframe (for slot format 33) includes 9 D symbols, 3 F symbols, and 2 U symbols. That is, there are now fewer U symbols in which the UE can transmit on a physical uplink control channel (PUCCH). This can cause a collision for a feedback message, such as an acknowledgement (ACK) or a negative acknowledgement (NACK), that is to be transmitted in a U symbol.

In the first subframe of 3, the UE may receive a downlink communication on a physical downlink shared channel (PDSCH). The downlink communication may be an SPS communication (e.g., an SPS PDSCH communication) with an SPS period of 1 ms. A time period K1 may be a duration between the receiving a PDSCH communication (e.g., the SPS PDSCH communication) and a scheduled time for transmitting feedback for the PDSCH communication. For example, the feedback for the PDSCH communication may be HARQ feedback, such as a HARQ acknowledgement (HARQ-ACK) or a HARQ negative acknowledgement (HARQ-NACK). The K1 value may be referred to as the PDSCH-to-HARQ feedback timing value. In some examples, the K1 value for SPS communications may be indicated in an SPS configuration or in downlink control information (DCI) that activates the SPS communications associated with an SPS configuration. After the K1 time period from receiving the SPS PDSCH communication, the UE may transmit a feedback message (e.g., ACK 302) in an available U symbol. However, due to the slot format change for the next subframe, the UE may not be able to transmit a feedback message (e.g., ACK or NACK 304) at an expected U symbol. What was previously a U symbol in the first subframe is now a D symbol in the next subframe, and thus the feedback message, scheduled for a U symbol, collides with the D symbol. In an ultra-reliable low-latency communication (URLLC) scenario, the feedback message needs to be transmitted despite the initial collision, and the UE may defer the feedback message and attempt to transmit the feedback message in a first available PUCCH resource (e.g., a next available PUCCH resource after the collision between the feedback message (e.g., HARQ-ACK/NACK) for the SPS PDSCH communication and the D symbol). For example, the first available PUCCH resource may be in a first available U symbol 306 after the collision between the feedback message and the D symbol (e.g., K1+7 symbols in FIG. 3).

As indicated above, FIG. 3 is provided as an example. Other examples may differ from what is described with regard to FIG. 3.

In some examples, a UE may defer SPS HARQ feedback (e.g., HARQ feedback for an SPS communication) from an initial slot (or sub-slot) in which the SPS HARQ feedback is scheduled if there is a collision between the SPS HARQ feedback and a downlink symbol and if a PUCCH resource associated with the SPS HARQ feedback (e.g., according to a list of PUCCH resources for SPS HARQ feedback configured for the UE) is not available in the initial slot. In this case, another uplink resource (e.g., another PUCCH resource or a resource allocated for a PUSCH communication) may be scheduled for the UE in the initial slot, but the UE may defer the SPS HARQ feedback to another slot instead of using the other uplink resource. This may result in additional delay in transmitting the deferred SPS HARQ feedback. In some cases, a slot format change may result in multiple UEs deferring SPS HARQ feedback to the same first available PUCCH resource. This may cause collisions of the deferred SPS HARQ feedback from multiple UEs on the first available PUCCH resource, which may reduce the reliability of the deferred HARQ feedback.

Some techniques and apparatuses described herein enable a UE to receive, from a base station, an indication to multiplex a deferred HARQ feedback for an SPS downlink communication with a PUSCH communication. The UE may defer HARQ feedback for the SPS downlink communication in connection with a collision between the HARQ feedback and a downlink symbol, and the UE may transmit, to the base station, the deferred HARQ feedback for the SPS communication multiplexed with the PUSCH communication. As a result, the UE may multiplex deferred SPS HARQ feedback with a PUSCH communication scheduled in the slot in which the SPS HARQ feedback collides with a downlink symbol, which may reduce the delay in transmitting the deferred SPS HARQ feedback as compared with deferring the SPS HARQ feedback to an available PUCCH resource in another slot. Furthermore, multiplexing the deferred SPS HARQ feedback with the PUSCH communication may result in reduced collisions between transmissions of deferred HARQ feedback from different UEs on a first available PUCCH resource, which may increase the reliability of the deferred HARQ feedback transmissions. Multiplexing the deferred SPS HARQ feedback with the PUSCH communication may also result in increased flexibility in allocating uplink resources (e.g., because the network may not need to reserve resources for attempts by the UE to find the first available PUCCH resource) and reduced UE power consumption due to the UE not having to find the first available PUCCH resource for transmitting the deferred SPS HARQ feedback.

Figure 4:
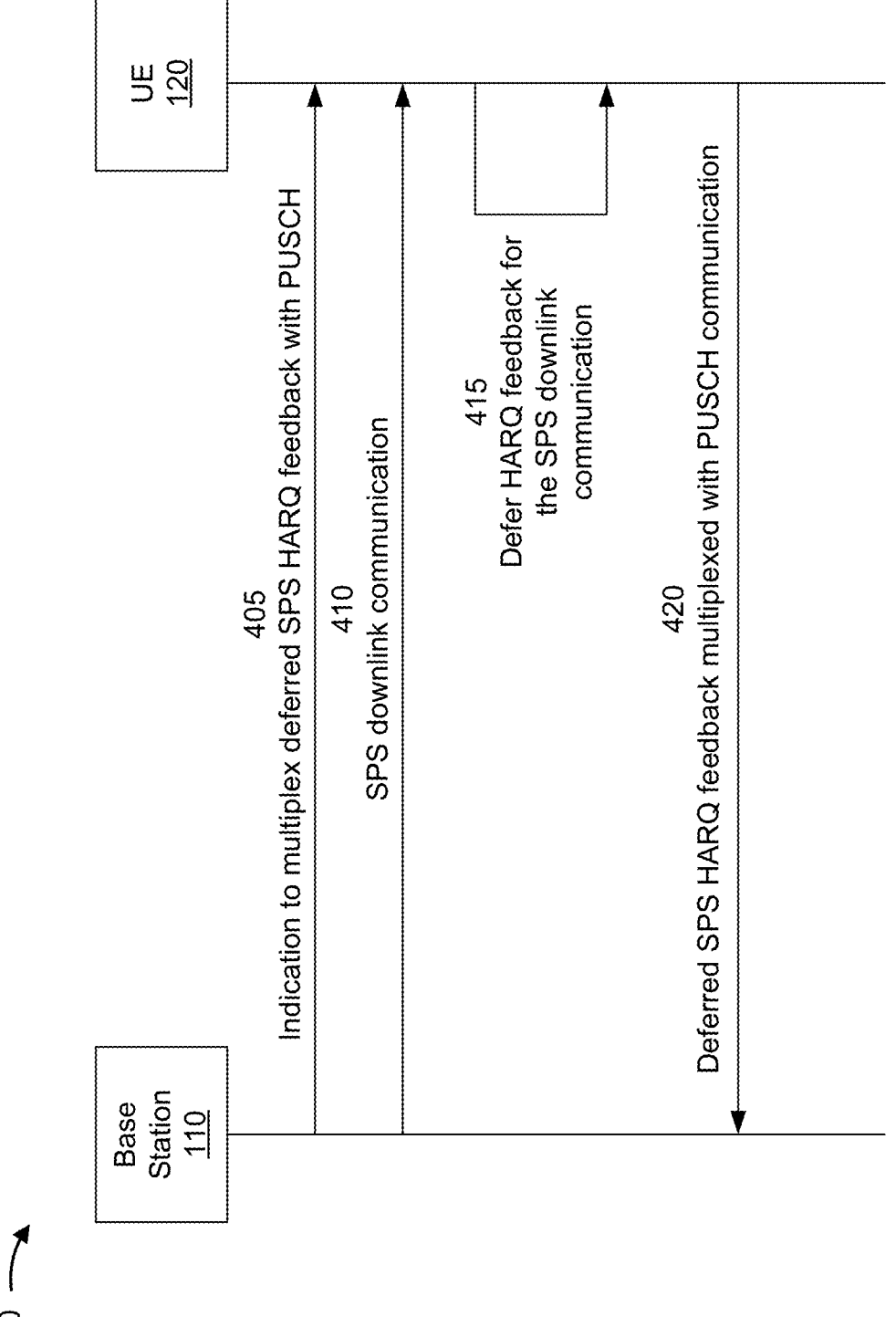
FIGS. 4-6 are diagrams illustrating examples associated with deferring semi-persistent scheduling (SPS) hybrid automatic repeat request (HARQ) feedback onto a physical uplink shared channel (PUSCH), in accordance with the present disclosure.

FIG. 4 is a diagram illustrating an example 400 associated with deferring SPS HARQ feedback onto a PUSCH, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, the base station 110 may transmit, to the UE 120, an indication to multiplex deferred SPS HARQ feedback with a PUSCH communication. The UE 120 may receive the indication transmitted by the base station 110.

In some aspects, the indication may be included in DCI transmitted (e.g., in a PDCCH communication) from the base station 110 to the UE 120. In some aspects, DCI that schedules a PUSCH communication, such as DCI format 0_0 (DCI 0_0) and/or DCI format 0_1 (DCI 0_1) (collectively referred to herein as "DCI 0_x"), may indicate, to the UE 120, to multiplex a deferred HARQ feedback for an SPS communication with the PUSCH communication. For example, the DCI (e.g., DCI 0_x) that schedules a PUSCH communication may include an indication to multiplex a deferred HARQ feedback for an SPS communication with the PUSCH communication on the resource (e.g., time and frequency resource) allocated for the PUSCH communication in the DCI.

In some aspects, the base station 110 may transmit the indication in the DCI for a PUSCH communication based at least in part on a determination that the HARQ feedback for an SPS communication will collide with a downlink symbol. In some aspects, the PUSCH may be a PUSCH to be transmitted by the UE 120 in the same slot as a slot in which the HARQ feedback for the SPS communication will collide with the downlink symbol. The DCI may indicate a K2 value that is a time offset between reception of the DCI by the UE 120 and the scheduled resources for transmission of the PUSCH communication by the UE 120. The K2 value may provide a PUSCH preparation time in which the UE 120 prepares to transmit the PUSCH communication. In some aspects, the K2 may be greater than or equal to a minimum PUSCH preparation time associated with the SCS and a UE PUSCH timing capability of the UE 120. For example, for a UE PUSCH timing capability 2, the minimum PUSCH preparation time may be equal to 5 symbols (e.g., K2≥5 symbols) for an SCS of 15 kHz, and the minimum PUSCH preparation time may be equal to 36 symbols (e.g., K2≥36 symbols) for an SCS of 120 kHz. In many cases, the base station 110 may transmit the DCI (e.g., DCI 0_x) that schedules the PUSCH communication in one or more slots prior to the slot in which the PUSCH communication is scheduled/transmitted. However, in some cases (e.g., UE PUSCH timing capability 1 or UE PUSCH timing capability 2 and an SCS of 15 kHz or an SCS of 30 kHz), the base station 110 may transmit the DCI (e.g., DCI 0_x) that schedules the PUSCH communication in the same slot as the slot in which the PUSCH communication is scheduled/transmitted.

In some aspects, in a case in which the base station 110 transmits the DCI in the same slot in which the PUSCH communication is scheduled/transmitted, the base station 110, when transmitting the DCI, may be aware of a collision between a scheduled SPS HARQ feedback (e.g., a symbol in which HARQ feedback for an SPS downlink communication is scheduled to be transmitted by the UE 120) and a downlink symbol in the same slot as the DCI transmission and the scheduled PUSCH communication. In some aspects, in a case in which the base station 110 transmits the DCI before the slot in which the PUSCH is scheduled/transmitted and the SPS HARQ collides with the downlink symbol, the base station 110, the base station 110, when transmitting the DCI, may be aware of an RRC dictated slot format change that will take effect 1, 2, or 3 slots later (e.g., up to 2 ms later). In this case, the base station 110 may determine that the slot format change will result in a collision between a scheduled SPS HARQ feedback and a downlink symbol. For example, the base station 110, when transmitting the DCI, may be aware of a slot format change indicated in an RRC message (e.g., an RRC reconfiguration) that will result in a collision between a scheduled SPS HARQ feedback and a downlink symbol in a slot in which the PUSCH is scheduled based at least in part on an RRC processing time (e.g., for processing the RRC message) being longer than the K2 value (e.g., the PUSCH processing time). In some aspects, the base station 110 may be aware of scheduling decisions for a next N slots when transmitting the DCI, and the base station 110 may determine, based at least in part on the scheduling decisions for the next N slots, that an upcoming slot format change via an SFI will result in a collision between a scheduled SPS HARQ feedback and a downlink symbol in the slot in which the PUSCH communication is scheduled/transmitted.

In some aspects, the indication to multiplex a deferred HARQ feedback for an SPS communication with the PUSCH communication scheduled by the DCI may be included in a downlink assignment index (DAI) field of the DCI. In some aspects, the DAI field may include multiple bits, and 1 bit of the DAI field may be used for the indication to multiplex the deferred SPS HARQ with the PUSCH communication, with the remaining bits used to indicate the DAI for the PUSCH communication. For example, in a case in which the DAI field includes 4 bits, the first 3 bits of the DAI field may be used to indicate the DAI, and the last bit of the DAI field may indicate whether to multiplex a deferred HARQ feedback with the PUSCH communication. In some aspects, the value of the one DAI bit that provides the indication (e.g., the last bit of the DAI field) may be set to 1 to provide an indication to multiplex a type 1 HARQ codebook with the PUSCH communication.

In some aspects, the DCI may include a dedicated field for indicating whether to multiplex a deferred HARQ feedback for an SPS communication with the PUSCH communication scheduled by the DCI. For example, the DCI (e.g., DCI 0_x) may be configured with an extra field for the indication of whether to multiplex deferred SPS HARQ feedback with the PUSCH communication. In this case, the DCI field associated with the indication may be set to a first value (e.g., 0) to deactivate the multiplexing of deferred SPS HARQ feedback with the PUSCH communication or a second value (e.g., 1) to activate the multiplexing of deferred SPS HARQ feedback with the PUSCH communication.

In some aspects, in connection with the determination that the HARQ feedback for an SPS communication will collide with a downlink symbol, the base station 110 may transmit the indication to multiplex the deferred SPS HARQ feedback with the PUSCH communication based at least in part on a determination that the PUSCH communication is scheduled before a next available PUCCH resource after the collision (e.g., a next available PUCCH resource after the initial symbol at which the HARQ feedback was scheduled). For example, the base station 110 may activate the multiplexing of the deferred SPS HARQ feedback and the PUSCH communication in a case in which the PUSCH communication is scheduled prior to the next available PUCCH resource, and the base station 110 may deactivate the multiplexing of the deferred SPS HARQ feedback and the PUSCH communication in a case in which the PUSCH communication is scheduled after the next available PUCCH communication.

In some aspects, in connection with the determination that the HARQ feedback for an SPS communication will collide with a downlink symbol, the base station 110 may transmit the indication to multiplex the deferred SPS HARQ feedback with the PUSCH communication based at least in part on a determination that transmission (by the UE 120) of the deferred HARQ feedback on the next available PUCCH resource after the collision (e.g., after the initial symbol at which the HARQ feedback was scheduled) will result in a collision (e.g., with one or more uplink transmissions from one or more other UEs) on the next available PUCCH resource. For example, the base station 110 may activate the multiplexing of the deferred SPS HARQ feedback with the PUSCH communication to reduce and/or avoid collisions on the next available PUCCH resource. In some aspects, the base station 110 may indicate, to the UE 120, to multiplex the deferred SPS HARQ feedback with a PUSCH communication scheduled in the same slot as the collision. In some aspects, the base station 110 may indicate, to the UE 120, to multiplex the deferred SPS HARQ feedback with a PUSCH communication scheduled in a different slot from the collision. For example, the base station 110 may provide the indication in DCI scheduling a PUSCH communication in a target slot other than the slot in which the collision occurs to indicate, to the UE 120, to multiplex the deferred SPS HARQ feedback onto the PUSCH communication in the target slot. In some aspects, the base station 110 may transmit the indication to multiplex the deferred SPS HARQ feedback with the PUSCH communication regardless of whether the PUSCH communication is scheduled before or after the next available PUCCH resource after the collision. For example, the base station 110 may activate the multiplexing of the deferred HARQ feedback and the PUSCH communication even if the next available PUCCH resource is earlier than the scheduled PUSCH communication.

In some aspects, the base station 110 may activate multiplexing of the deferred SPS HARQ feedback with a PUSCH communication based at least in part on a determination that the PUSCH communication is to be scheduled in the same slot (or one or more slots subsequent to) a collision between the SPS HARQ feedback and a downlink symbol. In some aspects (e.g., to reduce and/or avoid collisions on a next available PUCCH resource after a collision between a scheduled SPS HARQ feedback and a downlink symbol), the base station 110 may schedule a PUSCH communication in the same slot as (or one or more slots subsequent to) the collision, and the base station 110 may indicate, to the UE 120 (e.g., in the DCI that schedules the PUSCH communication), to multiplex deferred SPS HARQ with the PUSCH communication.

In some aspects, the indication to multiplex deferred HARQ feedback for an SPS communication with a PUSCH communication may be included in an RRC configuration transmitted from the base station 110 to the UE 120. In some aspects, the indication in the RRC configuration may configure the UE 120 to always try to multiplex deferred SPS HARQ feedback onto an earliest scheduled PUSCH communication after a collision between the SPS HARQ feedback and a downlink symbol. In some aspects, the indication in the RRC configuration may configure the UE 120 to multiplex the deferred HARQ feedback onto an earliest scheduled PUSCH communication after a collision between the SPS HARQ feedback and a downlink symbol if the earliest scheduled PUSCH communication is scheduled before a next available PUCCH resource after the collision. In this case, the UE 120 may transmit the deferred SPS HARQ feedback on the next available PUCCH resource if the next available PUCCH resource is before the earliest scheduled PUSCH communication after the collision. In this case, the DCI that schedules the earliest scheduled PUSCH communication after the collision may indicate, to the UE 120, to multiplex the deferred SPS HARQ feedback onto the earliest scheduled PUSCH communication after the collision by scheduling the earliest scheduled PUSCH communication after the collision before the next available PUCCH resource after the collision. In some aspects, in a case in which the indication is included in the RRC configuration, the base station 110 may consider the multiplexed SPS HARQ payload when scheduling PUSCH communications.

In some aspects, the indication in the RRC configuration may configure the UE 120 to multiplex deferred SPS HARQ feedback onto configured grant (CG) PUSCH communications (e.g., using periodic uplink resources configured for CG PUSCH communications) in addition to, or instead of, PUSCH communications scheduled via uplink grants (e.g., via DCI 0_x). For example, the indication in the RRC may apply to all PUSCH communications (e.g., including CG PUSCH communications and PUSCH communications scheduled via uplink grants), or the base station 110 may transmit separate indications for multiplexing with PUSCH communications scheduled via uplink grants and for multiplexing with CG PUSCH communications.

In some aspects, the indication to multiplex deferred HARQ feedback for an SPS communication with a PUSCH communication may be included in a medium access control (MAC) control element (MAC-CE) transmitted from the base station 110 to the UE 120. For example, the base station 110 may transmit the MAC-CE including the indication to activate multiplexing of deferred SPS HARQ feedback with a PUSCH communication. In some aspects, the MAC-CE may activate multiplexing of deferred SPS HARQ feedback with CG PUSCH communications, in addition to, or instead of, PUSCH communications scheduled via uplink grants. For example, the indication in the MAC-CE may apply to all PUSCH communications (e.g., including CG PUSCH communications and PUSCH communications scheduled via uplink grants), or the base station 110 may transmit separate indications for multiplexing with PUSCH communications scheduled via uplink grants and for multiplexing with CG PUSCH communications.

As further shown in FIG. 4, and by reference number 410, the base station 110 may transmit, to the UE 120, an SPS downlink communication. For example, the SPS downlink communication may be an SPS PDSCH communication. The base station 110 may transmit the SPS downlink communication to the UE 120 in a periodically occurring SPS occasion configured for the UE 120 in an SPS configuration. The UE 120 may receive the SPS downlink communication transmitted by the base station 110.

As further shown in FIG. 4, and by reference number 415, the UE 120 may defer the HARQ feedback for the SPS downlink communication. In some aspects, the UE 120 may defer the HARQ feedback for the SPS downlink communication based at least in part on detecting a collision between the HARQ feedback for the SPS downlink communication and a downlink symbol in a slot. The UE 120 may determine an initial symbol in which the HARQ feedback for the SPS downlink communication is scheduled/configured to be transmitted based at least in part on the K1 value (e.g., the PDSCH-to-HARQ feedback timing value) configured for the UE 120 for SPS downlink communication. The UE 120 may then determine whether there is a collision between the initial symbol associated with the HARQ feedback for the SPS downlink communication and a downlink symbol configured according to a slot format of the slot. For example, a collision between the SPS HARQ feedback and a downlink symbol may be caused by a slot format change (e.g., indicated in an RRC message or via an SFI).

In some aspects, the UE 120 may determine the HARQ feedback (e.g., HARQ-ACK or HARQ-NACK) for the SPS downlink communication. The UE 120 may then defer the HARQ feedback for the SPS downlink communication by storing the HARQ feedback in a buffer to be transmitted in a later symbol, sub-slot, or slot. The SPS HARQ feedback that is deferred from the initial symbol associated with the SPS HARQ feedback may be referred to as "deferred SPS HARQ feedback" and/or "deferred HARQ feedback for the SPS downlink communication."

As further shown in FIG. 4, and by reference number 420, the UE 120 may transmit, to the base station 110, the deferred SPS HARQ feedback (e.g., the deferred HARQ feedback for the SPS downlink communication) multiplexed with a PUSCH communication. The base station 110 may receive, from the UE 120, the deferred HARQ feedback multiplexed with the PUSCH communication.

The UE 120, based at least in part on the indication received from the base station 110, may multiplex the deferred HARQ feedback with the PUSCH communication on a resource associated with the PUSCH communication, and transmit the multiplexed deferred HARQ feedback and PUSCH communication to the base station 110 on the resource associated with PUSCH communication. In some aspects, the DCI that schedules the PUSCH communication may include the indication to multiplex the deferred SPS HARQ feedback with the PUSCH communication. In this case, the UE 120 may transmit the deferred SPS HARQ feedback multiplexed with the PUSCH communication on the resource allocated for the PUSCH communication in the DCI.

In some aspects, based at least in part on the indication in the DCI, the UE 120 may multiplex the deferred SPS HARQ feedback with a PUSCH communication in the same slot as the collision (e.g., in the same slot as the initial symbol from which the deferred SPS feedback is deferred). In some aspects, based at least in part on the indication in the DCI, the UE 120 may multiplex the deferred SPS HARQ feedback with a PUSCH communication in a different slot from the collision (e.g., in a different slot from the initial symbol from which the deferred SPS feedback is deferred). In some aspects, based at least in part on the indication in the DCI, the UE 120 may multiplex the deferred SPS HARQ feedback on a PUSCH communication that is scheduled after (e.g., in a later slot, sub-slot, or symbol than) a next available PUCCH resource after the collision (e.g., after the initial symbol from which the deferred SPS HARQ feedback is deferred). In this case, the UE 120 may multiplex the deferred SPS HARQ feedback on the PUSCH communication scheduled by the DCI, even though the next available PUCCH resource after the collision is earlier than the scheduled PUSCH communication.

In some aspects, the PUSCH communication may be an earliest scheduled PUSCH communication after the collision (e.g., after the initial symbol from which the deferred SPS HARQ feedback is deferred). For example, based at least in part on receiving the indication (e.g., in an RRC configuration or a MAC-CE), the UE 120 may search for the earliest scheduled PUSCH communication after the collision, and the UE 120 may multiplex the deferred SPS HARQ feedback with the earliest scheduled PUSCH communication after the collision. In some aspects, the UE 120 may transmit the deferred SPS HARQ feedback with the PUSCH communication (e.g., the earliest scheduled PUSCH communication after the collision) based at least in part on a determination that the PUSCH communication is scheduled before a next available PUCCH resource after the collision. In this case, by scheduling the PUSCH communication before the next available PUCCH resource after the collision, the DCI that schedules the PUSCH communication indicates to the UE 120 to multiplex the deferred SPS HARQ feedback with the PUSCH communication. For example, in this case, the UE 120 may transmit the deferred SPS HARQ feedback using the next available PUCCH resource after the collision if the next available PUCCH resource is before the PUSCH communication (e.g., the earliest scheduled PUSCH communication).

In some aspects, based at least in part on receiving the indication (e.g., in an RRC configuration or a MAC-CE), the UE 120 may multiplex the deferred SPS HARQ feedback with a CG PUSCH communication. For example, the UE 120 may transmit the deferred SPS HARQ multiplexed with a CG PUSCH communication on a resource configured for the CG PUSCH communication based at least in part on a determination that the CG PUSCH communication is the earliest scheduled PUSCH communication after the collision. In some aspects, the UE 120 may adjust beta factors for the CG PUSCH communication in order to multiplex the deferred SPS HARQ feedback on the resource configured for the CG PUSCH communication.

As described above, the UE 120 may receive, from the base station 110, an indication to multiplex a deferred HARQ feedback for an SPS downlink communication with a PUSCH communication. The UE 120 may defer HARQ feedback for the SPS downlink communication in connection with a collision between the HARQ feedback and a downlink symbol, and the UE may transmit, to the base station, the deferred HARQ feedback for the SPS communication multiplexed with the PUSCH communication. In some aspects, the UE 120 may multiplex deferred SPS HARQ feedback with a PUSCH communication scheduled in the slot in which the SPS HARQ feedback collides with a downlink symbol, which may reduce the delay in transmitting the deferred SPS HARQ feedback as compared with deferring the SPS HARQ feedback to an available PUCCH resource in another slot. Furthermore, multiplexing the deferred SPS HARQ feedback with the PUSCH communication may result in reduced collisions between transmissions of deferred HARQ feedback from different UEs on a first available PUCCH resource, which may increase the reliability of the deferred HARQ feedback transmissions. Multiplexing the deferred SPS HARQ feedback with the PUSCH communication may also result in increased flexibility in allocating uplink resources and in reduced UE power consumption.

As indicated above, FIG. 4 is provided as an example. Other examples may differ from what is described with respect to FIG. 4.

Figure 5:
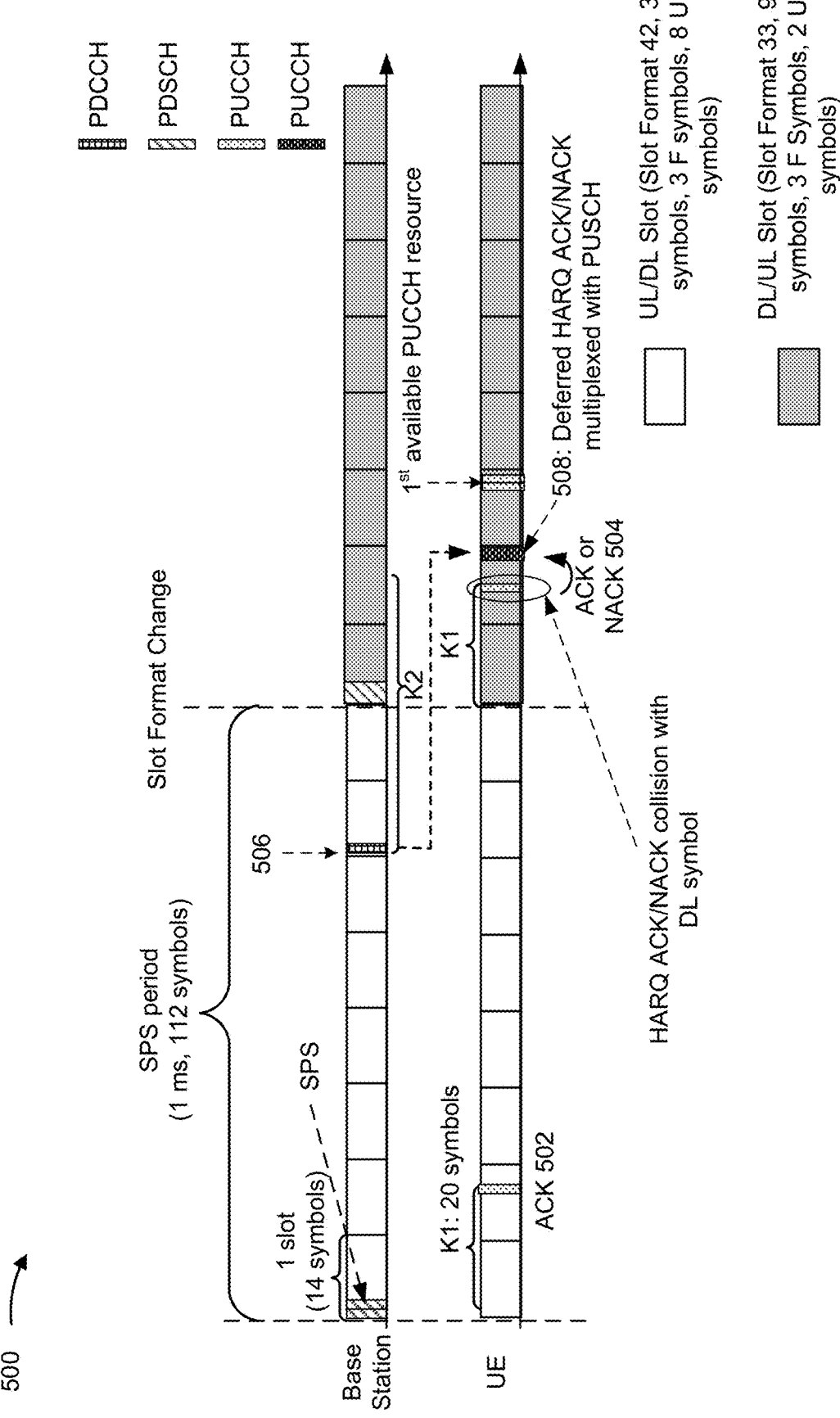

FIG. 5 is a diagram illustrating an example 500 associated with deferring SPS HARQ feedback onto a PUSCH, in accordance with the present disclosure. As shown in FIG. 5, example 500 shows 8 slots of a first subframe, where each slot (in slot format 42) includes 3 D symbols, 3 F symbols, and 8 U symbols. After a slot format change, each slot in the next subframe (for slot format 33) includes 9 D symbols, 3 F symbols, and 2 U symbols.

As shown in FIG. 5, in the first subframe, the base station may transmit, to the UE, an SPS downlink communication (e.g., an SPS PDSCH communication). For example, the SPS downlink communication may have an SPS period of 1 ms. The UE may receive the SPS downlink communication, and the UE may transmit HARQ feedback (e.g., ACK 502) for the SPS downlink communication in a symbol (e.g., a U symbol) determined based on the K1 value (e.g., K1=20 symbols in FIG. 5). However, due to the slot format change for the next subframe, the UE may not be able to transmit HARQ feedback (e.g., ACK or NACK 504) for the SPS downlink communication received in the next subframe. For example, what was previously a U symbol in the first subframe may now be a D symbol in the next subframe, and thus the HARQ feedback, scheduled for a U symbol, may collide with the D symbol. In some aspects, the UE may determine to defer the HARQ feedback for the SPS downlink communication based at least in part on the collision between the HARQ feedback and the D symbol.

As further shown in FIG. 5 and by reference number 506, the base station may transmit, to the UE, DCI (e.g., in a PDCCH communication) that schedules a PUSCH communication for the UE, and the DCI may include an indication to multiplex the deferred HARQ feedback for the SPS communication with the PUSCH communication scheduled by the DCI. The DCI may indicate the time and frequency resources for the scheduled PUSCH communication. For example, the starting symbol for transmitting the PUSCH communication may be indicated by the K2 value (e.g., K2=40 symbols in FIG. 5). As shown by reference number 508, the UE, based at least in part on receiving the indication in the DCI, may multiplex the deferred HARQ feedback (e.g., ACK or NACK 504) with the PUSCH communication. For example, the UE may transmit, to the base station, the deferred HARQ ACK/NACK for the SPS communication multiplexed with the PUSCH communication on the resource allocated for the PUSCH communication.

As shown in FIG. 5, in some aspects, the UE may multiplex the deferred HARQ feedback for the SPS communication with a PUSCH communication that is in the same slot as the collision (e.g., the same slot as the symbol from which the deferred HARQ feedback is deferred). For example, the PUSCH communication may be earlier than a first available PUCCH resource after the collision, which is in a subsequent slot in FIG. 5. This may reduce the delay in transmitting the deferred SPS HARQ feedback as compared with deferring the SPS HARQ feedback to the first available PUCCH resource in the subsequent slot. Furthermore, multiplexing the deferred SPS HARQ feedback with the PUSCH communication may result in reduced collisions between transmissions of deferred HARQ feedback from different UEs on the first available PUCCH resource, which may increase the reliability of the deferred HARQ feedback transmissions.

As indicated above, FIG. 5 is provided as an example. Other examples may differ from what is described with respect to FIG. 5.

Figure 6:
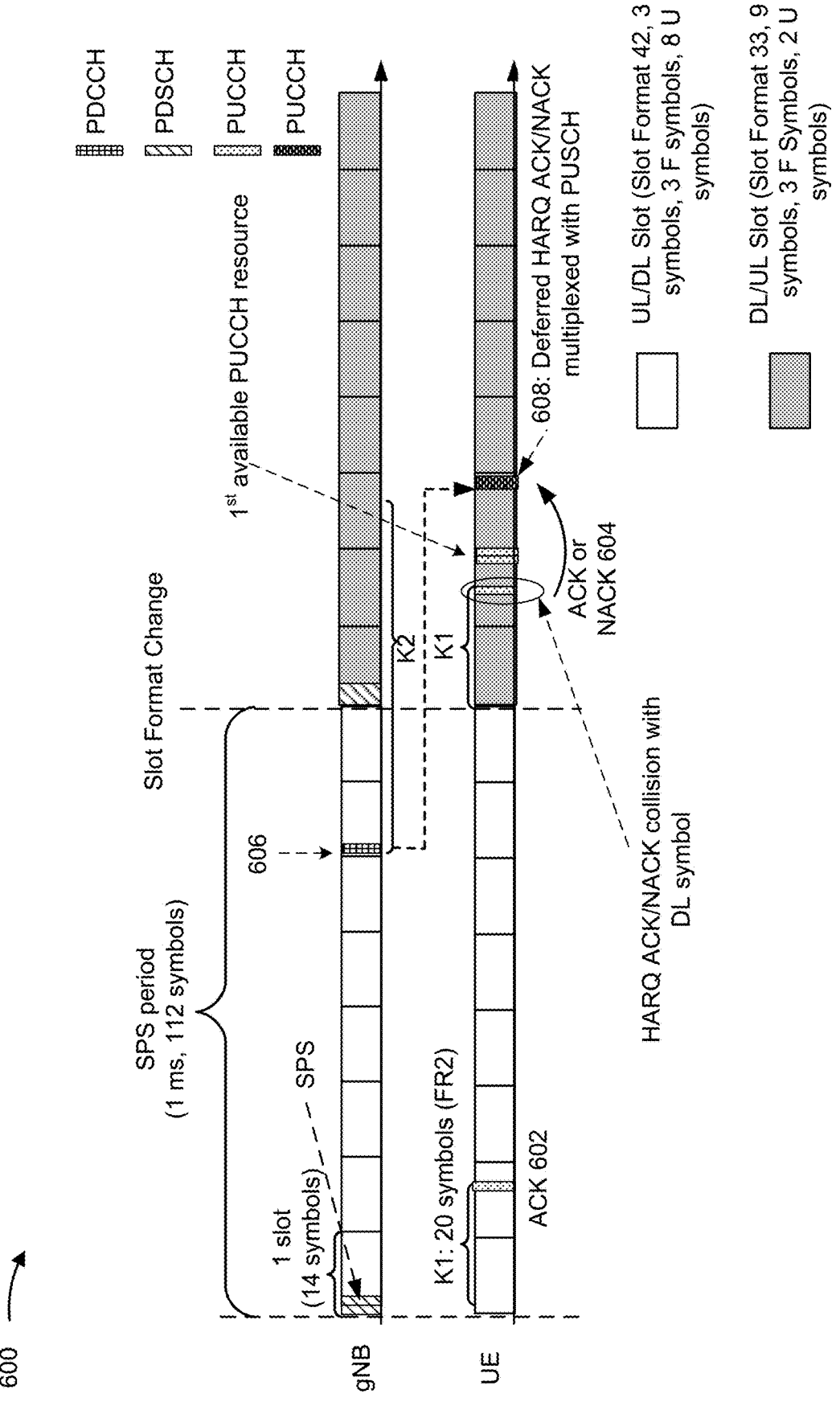

FIG. 6 is a diagram illustrating an example 600 associated with deferring SPS HARQ feedback onto a PUSCH, in accordance with the present disclosure. As shown in FIG. 6, example 600 shows 8 slots of a first subframe, where each slot (in slot format 42) includes 3 D symbols, 3 F symbols, and 8 U symbols. After a slot format change, each slot in the next subframe (for slot format 33) includes 9 D symbols, 3 F symbols, and 2 U symbols As shown in FIG. 6, in the first subframe, the base station may transmit, to the UE, an SPS downlink communication (e.g., an SPS PDSCH communication). For example, the SPS downlink communication may have an SPS period of 1 ms. The UE may receive the SPS downlink communication, and the UE may transmit HARQ feedback (e.g., ACK 602) for the SPS downlink communication in a symbol (e.g., a U symbol) determined based on the K1 value (e.g., K1=20 symbols in FIG. 6). However, due to the slot format change for the next subframe, the UE may not be able to transmit HARQ feedback (e.g., ACK or NACK 604) for the SPS downlink communication received in the next subframe. For example, what was previously a U symbol in the first subframe may now be a D symbol in the next subframe, and thus the HARQ feedback, scheduled for a U symbol, may collide with the D symbol. In some aspects, the UE may determine to defer the HARQ feedback for the SPS downlink communication based at least in part on the collision between the HARQ feedback and the D symbol.

As further shown in FIG. 6 and by reference number 606, the base station may transmit, to the UE, DCI (e.g., in a PDCCH communication) that schedules a PUSCH communication for the UE, and the DCI may include an indication to multiplex the deferred HARQ feedback for the SPS communication with the PUSCH communication scheduled by the DCI. The DCI may indicate the time and frequency resources for the scheduled PUSCH communication. For example, the starting symbol for transmitting the PUSCH communication may be indicated by the K2 value (e.g., K2=40 symbols in FIG. 6). As shown by reference number 608, the UE, based at least in part on receiving the indication in the DCI, may multiplex the deferred HARQ feedback (e.g., ACK or NACK 604) with the PUSCH communication. For example, the UE may transmit, to the base station, the deferred HARQ ACK/NACK for the SPS communication multiplexed with the PUSCH communication on the resource allocated for the PUSCH communication.

As shown in FIG. 6, in some aspects, the UE may multiplex the deferred HARQ feedback for the SPS communication with a PUSCH communication that is in a different slot from the collision (e.g., a different slot from the slot including the symbol from which the deferred HARQ feedback is deferred). As shown in FIG. 6, the PUSCH communication may be scheduled after (e.g., in a subsequent slot to) a first available PUCCH resource after the collision. For example, based at least in part on the indication included in the DCI, the UE may multiplex the deferred HARQ feedback for the SPS communication with the PUSCH communication scheduled by the DCI, even though the PUSCH communication is after the first available PUCCH resource after the collision. This may reduce collisions between transmissions of deferred HARQ feedback from different UEs on the first available PUCCH resource, which may increase the reliability of the deferred HARQ feedback transmissions.

As indicated above, FIG. 6 is provided as an example. Other examples may differ from what is described with respect to FIG. 6.

Figure 7:
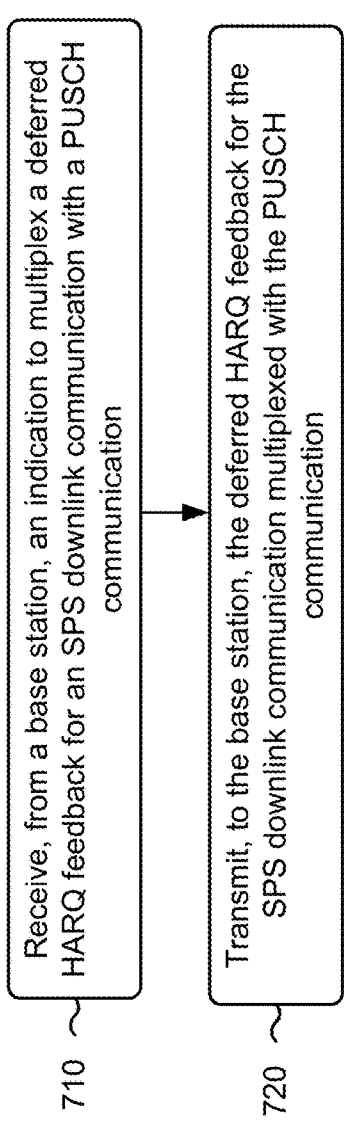
FIGS. 7-8 are diagrams illustrating example processes associated with deferring SPS HARQ feedback onto a PUSCH, in accordance with the present disclosure.

FIG. 7 is a diagram illustrating an example process 700 performed, for example, by a UE, in accordance with the present disclosure. Example process 700 is an example where the UE (e.g., UE 120) performs operations associated with deferring SPS HARQ feedback onto a PUSCH.

As shown in FIG. 7, in some aspects, process 700 may include receiving, from a base station, an indication to multiplex a deferred HARQ feedback for an SPS downlink communication with a PUSCH communication (block 710). For example, the UE (e.g., using communication manager 140 and/or reception component 902, depicted in FIG. 9) may receive, from a base station, an indication to multiplex a deferred HARQ feedback for an SPS downlink communication with a PUSCH communication, as described above.

As further shown in FIG. 7, in some aspects, process 700 may include transmitting, to the base station, the deferred HARQ feedback for the SPS downlink communication multiplexed with the PUSCH communication (block 720). For example, the UE (e.g., using communication manager 140 and/or transmission component 904, depicted in FIG. 9) may transmit, to the base station, the deferred HARQ feedback for the SPS downlink communication multiplexed with the PUSCH communication, as described above.

Process 700 may include additional aspects, such as any single aspect or any combination of aspects described below and/or in connection with one or more other processes described elsewhere herein.

In a first aspect, process 700 includes receiving the SPS downlink communication, and deferring HARQ feedback for the SPS downlink communication in connection with a collision between a symbol associated with the HARQ feedback for the SPS downlink communication and a configured downlink symbol, resulting in the deferred HARQ feedback for the SPS downlink communication.

In a second aspect, alone or in combination with the first aspect, receiving the indication to multiplex the deferred HARQ feedback for the SPS downlink communication with the PUSCH communication includes receiving DCI that schedules the PUSCH communication.

In a third aspect, alone or in combination with one or more of the first and second aspects, the DCI indicates to multiplex the deferred HARQ feedback for the SPS downlink communication based at least in part on scheduling the PUSCH communication before a next available PUCCH communication after a symbol from which the deferred HARQ feedback for the SPS downlink communication is deferred.

In a fourth aspect, alone or in combination with one or more of the first through third aspects, the indication is included in DCI that schedules the PUSCH communication.

In a fifth aspect, alone or in combination with one or more of the first and fourth aspects, the indication is included in a downlink assignment index field of the DCI.

In a sixth aspect, alone or in combination with one or more of the first through fifth aspects, the indication is included in the DCI in a dedicated field for indicating multiplexing of SPS HARQ feedback with the PUSCH communication.

In a seventh aspect, alone or in combination with one or more of the first through sixth aspects, transmitting the deferred HARQ feedback for the SPS downlink communication multiplexed with the PUSCH communication includes transmitting the deferred HARQ feedback for the SPS communication multiplexed with the PUSCH communication on a resource allocated for the PUSCH communication in the DCI.

In an eighth aspect, alone or in combination with one or more of the first through seventh aspects, the indication is included in an RRC configuration.

In a ninth aspect, alone or in combination with one or more of the first through eighth aspects, transmitting the deferred HARQ feedback for the SPS downlink communication multiplexed with the PUSCH communication includes multiplexing the deferred HARQ feedback for the SPS downlink communication with an earliest PUSCH communication after a symbol from which the deferred HARQ feedback for the SPS downlink communication is deferred.

In a tenth aspect, alone or in combination with one or more of the first through ninth aspects, the indication is included in a MAC-CE.

In an eleventh aspect, alone or in combination with one or more of the first through tenth aspects, the PUSCH communication is scheduled after a next available PUCCH resource after a symbol from which the deferred HARQ feedback for the SPS downlink communication is deferred.

In a twelfth aspect, alone or in combination with one or more of the first through eleventh aspects, transmitting the deferred HARQ feedback for the SPS downlink communication multiplexed with the PUSCH communication includes transmitting the deferred HARQ feedback for the SPS downlink communication multiplexed with the PUSCH communication based at least in part on a determination that the PUSCH communication is scheduled before a next available PUCCH communication after a symbol from which the deferred HARQ feedback for the SPS downlink communication is deferred.

In a thirteenth aspect, alone or in combination with one or more of the first through twelfth aspects, the PUSCH communication is a configured grant PUSCH communication.

In a fourteenth aspect, alone or in combination with one or more of the first through thirteenth aspects, transmitting the deferred HARQ feedback for the SPS downlink communication multiplexed with the PUSCH communication includes adjusting beta factors for the configured grant PUSCH communication to multiplex the deferred HARQ feedback for the SPS downlink communication with the configured grant PUSCH communication on a resource configured for the configured grant PUSCH communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
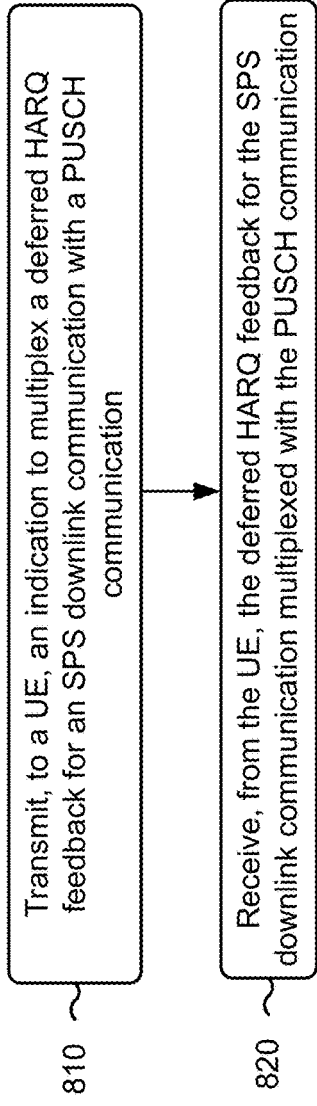

FIG. 8 is a diagram illustrating an example process 800 performed, for example, by a base station, in accordance with the present disclosure. Example process 800 is an example where the base station (e.g., base station 110) performs operations associated with deferring SPS HARQ feedback onto a PUSCH.

As shown in FIG. 8, in some aspects, process 800 may include transmitting, to a UE, an indication to multiplex a deferred HARQ feedback for an SPS downlink communication with a PUSCH communication (block 810). For example, the base station (e.g., using communication manager 150 and/or transmission component 1004, depicted in FIG. 10) may transmit, to a UE, an indication to multiplex a deferred HARQ feedback for an SPS downlink communication with a PUSCH communication, as described above.

As further shown in FIG. 8, in some aspects, process 800 may include receiving, from the UE, the deferred HARQ feedback for the SPS downlink communication multiplexed with the PUSCH communication (block 820). For example, the base station (e.g., using communication manager 150 and/or reception component 1002, depicted in FIG. 10) may receive, from the UE, the deferred HARQ feedback for the SPS downlink communication multiplexed with the PUSCH communication, as described above.

Process 800 may include additional aspects, such as any single aspect or any combination of aspects described below and/or in connection with one or more other processes described elsewhere herein.

In a first aspect, transmitting the indication includes transmitting the indication to the UE based at least in part on a determination that a symbol associated with HARQ feedback for the SPS downlink communication will collide with a configured downlink symbol.

In a second aspect, alone or in combination with the first aspect, transmitting the indication further includes transmitting the indication to the UE based at least in part on a determination that transmission of the deferred HARQ feedback for the SPS downlink communication on a next available PUCCH resource after the symbol associated with the HARQ feedback for the SPS downlink communication will result in a collision on the next available PUCCH resource.

In a third aspect, alone or in combination with one or more of the first and second aspects, transmitting the indication further includes transmitting the indication to the UE based at least in part on a determination that the PUSCH communication is scheduled before a next available PUCCH resource after the symbol associated with the HARQ feedback for the SPS downlink communication.

In a fourth aspect, alone or in combination with one or more of the first through third aspects, process 800 includes transmitting, to the UE, the SPS downlink communication.

In a fifth aspect, alone or in combination with one or more of the first through fourth aspects, transmitting the indication includes transmitting DCI that schedules the PUSCH communication.

In a sixth aspect, alone or in combination with one or more of the first through fifth aspects, the DCI indicates to multiplex the deferred HARQ feedback for the SPS downlink communication based at least in part on scheduling the PUSCH communication before a next available PUCCH communication after a symbol from which the deferred HARQ feedback for the SPS downlink communication is deferred.

In a seventh aspect, alone or in combination with one or more of the first through fourth aspects, the indication is included in DCI that schedules the PUSCH communication.

In an eighth aspect, alone or in combination with one or more of the first through seventh aspects, the indication is included in a downlink assignment index field of the DCI.

In a ninth aspect, alone or in combination with one or more of the first through eighth aspects, the indication is included in the DCI in a dedicated field for indicating multiplexing of SPS HARQ feedback with the PUSCH communication.

In a tenth aspect, alone or in combination with one or more of the first through ninth aspects, receiving the deferred HARQ feedback for the SPS downlink communication multiplexed with the PUSCH communication includes receiving the deferred HARQ feedback for the SPS communication multiplexed with the PUSCH communication on a resource allocated for the PUSCH communication in the DCI.

In an eleventh aspect, alone or in combination with one or more of the first through tenth aspects, the indication is included in an RRC configuration.

In a twelfth aspect, alone or in combination with one or more of the first through eleventh aspects, the indication is included in a MAC-CE.

In a thirteenth aspect, alone or in combination with one or more of the first through twelfth aspects, the PUSCH communication is scheduled after a next available PUCCH resource after a symbol from which the deferred HARQ feedback for the SPS downlink communication is deferred.

In a fourteenth aspect, alone or in combination with one or more of the first through thirteenth aspects, the PUSCH communication is a configured grant PUSCH communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
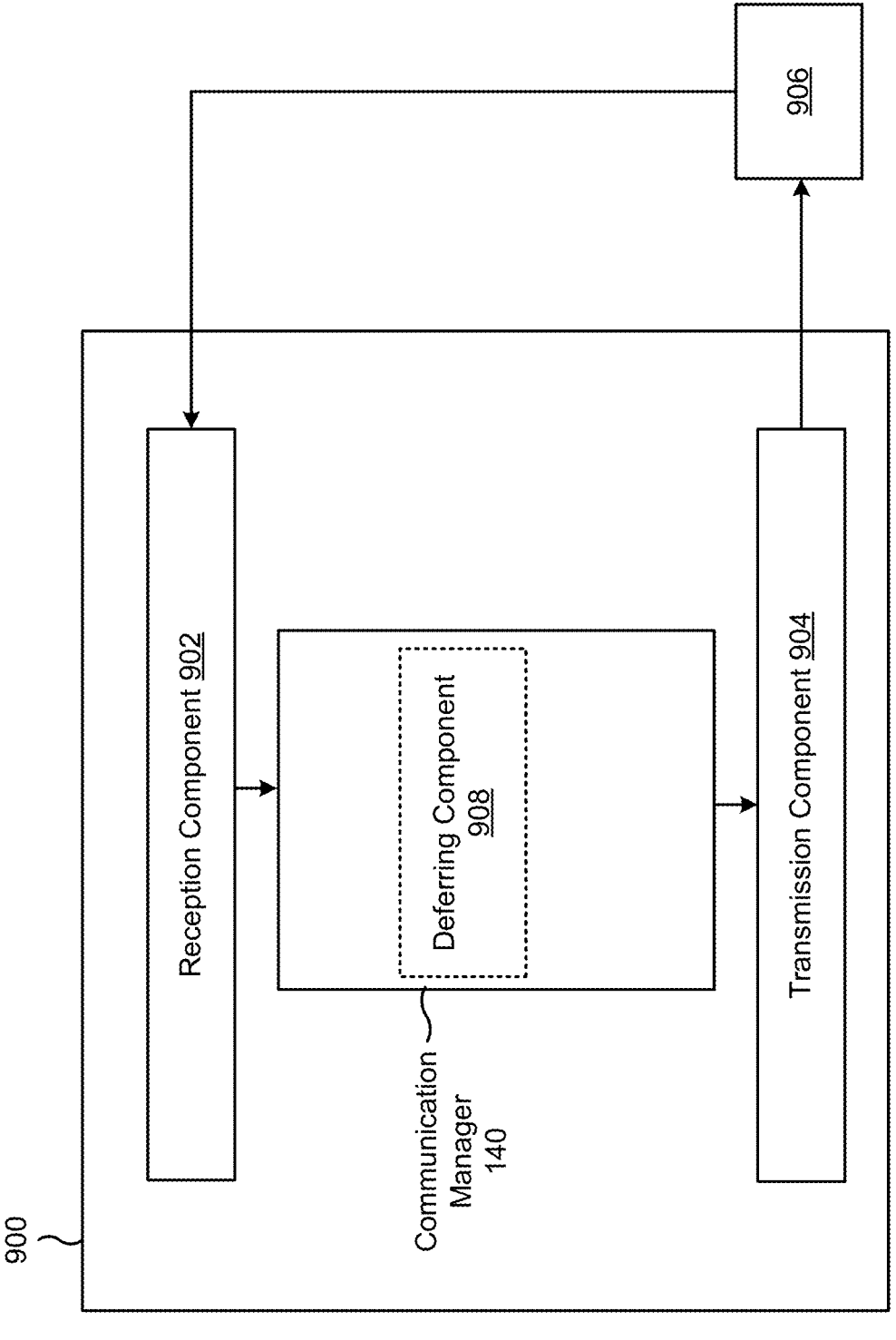
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a deferring component 908.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, an indication to multiplex a deferred HARQ feedback for an SPS downlink communication with a PUSCH communication. The transmission component 904 may transmit, to the base station, the deferred HARQ feedback for the SPS downlink communication multiplexed with the PUSCH communication.

The reception component 902 may receive the SPS downlink communication.

The deferring component 908 may defer HARQ feedback for the SPS downlink communication in connection with a collision between a symbol associated with the HARQ feedback for the SPS downlink communication and a configured downlink symbol, resulting in the deferred HARQ feedback for the SPS downlink communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
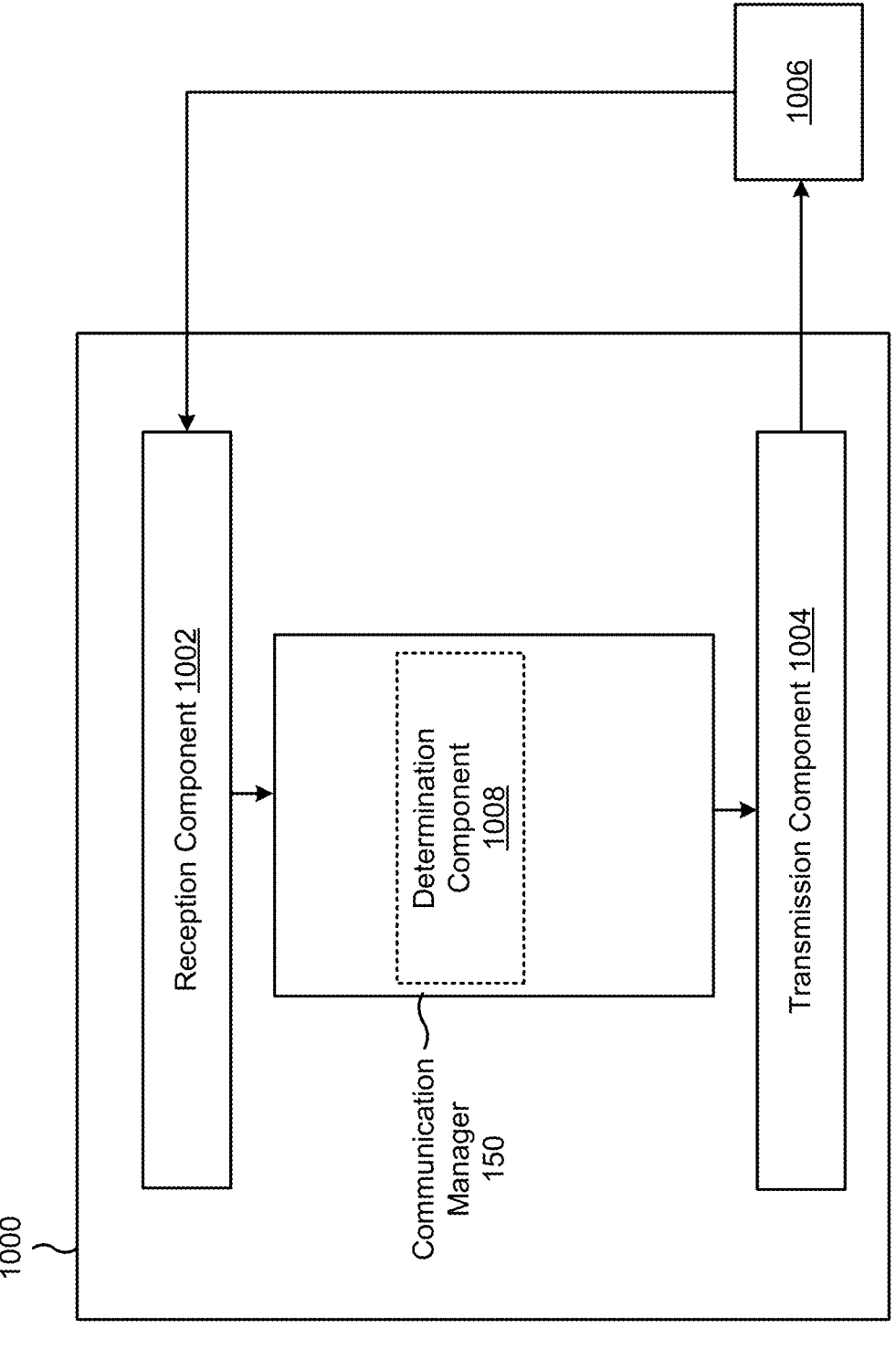

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, an indication to multiplex a deferred HARQ feedback for an SPS downlink communication with a PUSCH communication. The reception component 1002 may receive, from the UE, the deferred HARQ feedback for the SPS downlink communication multiplexed with the PUSCH communication.

The transmission component 1004 may transmit, to the UE, the SPS downlink communication.

The determination component 1008 may determine whether a symbol associated with HARQ feedback for the SPS downlink communication will collide with a configured downlink symbol.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, an indication to multiplex a deferred hybrid automatic repeat request (HARQ) feedback for a semi-persistent scheduling (SPS) downlink communication with a physical uplink shared channel (PUSCH) communication; and transmitting, to the base station, the deferred HARQ feedback for the SPS downlink communication multiplexed with the PUSCH communication.

Aspect 2: The method of Aspect 1, further comprising: receiving the SPS downlink communication; and deferring HARQ feedback for the SPS downlink communication in connection with a collision between a symbol associated with the HARQ feedback for the SPS downlink communication and a configured downlink symbol, resulting in the deferred HARQ feedback for the SPS downlink communication.

Aspect 3: The method of any of Aspects 1-2, wherein receiving the indication to multiplex the deferred HARQ feedback for the SPS downlink communication with the PUSCH communication comprises: receiving downlink control information (DCI) that schedules the PUSCH communication.

Aspect 4: The method of Aspect 3, wherein the DCI indicates to multiplex the deferred HARQ feedback for the SPS downlink communication based at least in part on scheduling the PUSCH communication before a next available physical uplink control channel (PUCCH) communication after a symbol from which the deferred HARQ feedback for the SPS downlink communication is deferred.

Aspect 5: The method of any of Aspects 1-4, wherein the indication is included in downlink control information (DCI) that schedules the PUSCH communication.

Aspect 6: The method of Aspect 5, wherein the indication is included in a downlink assignment index field of the DCI.

Aspect 7: The method of Aspect 5, wherein the indication is included in the DCI in a dedicated field for indicating multiplexing of SPS HARQ feedback with the PUSCH communication.

Aspect 8: The method of any of Aspects 3-7, wherein transmitting the deferred HARQ feedback for the SPS downlink communication multiplexed with the PUSCH communication comprises: transmitting the deferred HARQ feedback for the SPS communication multiplexed with the PUSCH communication on a resource allocated for the PUSCH communication in the DCI.

Aspect 9: The method of any of Aspects 1-2, wherein the indication is included in a radio resource control (RRC) configuration.

Aspect 10: The method of Aspect 9, wherein transmitting the deferred HARQ feedback for the SPS downlink communication multiplexed with the PUSCH communication comprises: multiplexing the deferred HARQ feedback for the SPS downlink communication with an earliest PUSCH communication after a symbol from which the deferred HARQ feedback for the SPS downlink communication is deferred.

Aspect 11: The method of any of Aspects 1-2, wherein the indication is included in a medium access control (MAC) control element (MAC-CE).

Aspect 12: The method of any of Aspects 1-3 and 4-11, wherein the PUSCH communication is scheduled after a next available physical uplink control channel (PUCCH) resource after a symbol from which the deferred HARQ feedback for the SPS downlink communication is deferred.

Aspect 13: The method of any of Aspects 1-12, wherein transmitting the deferred HARQ feedback for the SPS downlink communication multiplexed with the PUSCH communication comprises: transmitting the deferred HARQ feedback for the SPS downlink communication multiplexed with the PUSCH communication based at least in part on a determination that the PUSCH communication is scheduled before a next available physical uplink control channel (PUCCH) communication after a symbol from which the deferred HARQ feedback for the SPS downlink communication is deferred.

Aspect 14: The method of any of Aspects 1-2 and 9-13, wherein the PUSCH communication is a configured grant PUSCH communication.

Aspect 15: The method of Aspect 14, wherein transmitting the deferred HARQ feedback for the SPS downlink communication multiplexed with the PUSCH communication comprises: adjusting beta factors for the configured grant PUSCH communication to multiplex the deferred HARQ feedback for the SPS downlink communication with the configured grant PUSCH communication on a resource configured for the configured grant PUSCH communication.

Aspect 16: A method of wireless communication performed by a base station, comprising: transmitting, to a user equipment (UE), an indication to multiplex a deferred hybrid automatic repeat request (HARQ) feedback for a semi-persistent scheduling (SPS) downlink communication with a physical uplink shared channel (PUSCH) communication; and receiving, from the UE, the deferred HARQ feedback for the SPS downlink communication multiplexed with the PUSCH communication.

Aspect 17: The method of Aspect 16, wherein transmitting the indication comprises: transmitting the indication to the UE based at least in part on a determination that a symbol associated with HARQ feedback for the SPS downlink communication will collide with a configured downlink symbol.

Aspect 18: The method of Aspect 17, wherein transmitting the indication further comprises: transmitting the indication to the UE based at least in part on a determination that transmission of the deferred HARQ feedback for the SPS downlink communication on a next available physical uplink control channel (PUCCH) resource after the symbol associated with the HARQ feedback for the SPS downlink communication will result in a collision on the next available PUCCH resource.

Aspect 19: The method of any of Aspects 17-18, wherein transmitting the indication further comprises: transmitting the indication to the UE based at least in part on a determination that the PUSCH communication is scheduled before a next available physical uplink control channel (PUCCH) resource after the symbol associated with the HARQ feedback for the SPS downlink communication.

Aspect 20: The method of any of Aspects 16-19, further comprising: transmitting, to the UE, the SPS downlink communication.

Aspect 21: The method of any of Aspects 16-20, wherein transmitting the indication comprises: transmitting downlink control information (DCI) that schedules the PUSCH communication.

Aspect 22: The method of Aspect 21, wherein the DCI indicates to multiplex the deferred HARQ feedback for the SPS downlink communication based at least in part on scheduling the PUSCH communication before a next available physical uplink control channel (PUCCH) communication after a symbol from which the deferred HARQ feedback for the SPS downlink communication is deferred.

Aspect 23: The method of any of Aspects 16-22, wherein the indication is included in downlink control information (DCI) that schedules the PUSCH communication.

Aspect 24: The method of Aspect 23, wherein the indication is included in a downlink assignment index field of the DCI.

Aspect 25: The method of Aspect 23, wherein the indication is included in the DCI in a dedicated field for indicating multiplexing of SPS HARQ feedback with the PUSCH communication.

Aspect 26: The method of any of Aspects 21-25, wherein receiving the deferred HARQ feedback for the SPS downlink communication multiplexed with the PUSCH communication comprises: receiving the deferred HARQ feedback for the SPS communication multiplexed with the PUSCH communication on a resource allocated for the PUSCH communication in the DCI.

Aspect 27: The method of any of Aspects 16-20, wherein the indication is included in a radio resource control (RRC) configuration.

Aspect 28: The method of any of Aspects 16-20, wherein the indication is included in a medium access control (MAC) control element (MAC-CE).

Aspect 29: The method of any of Aspects 16-18, 20-21, and 23-28, wherein the PUSCH communication is scheduled after a next available physical uplink control channel (PUCCH) resource after a symbol from which the deferred HARQ feedback for the SPS downlink communication is deferred.

Aspect 30: The method of any of Aspects 16-29, wherein the PUSCH communication is a configured grant PUSCH communication.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

memory; and one or more processors, coupled to the memory, configured to:

receive, from a base station, an indication, included in a field, to multiplex a deferred hybrid automatic repeat request (HARQ) feedback for a semi-persistent scheduling (SPS) downlink communication with a physical uplink shared channel (PUSCH) communication, wherein the field is associated with multiplexing deferred HARQ feedback, and wherein the deferred HARQ feedback for the SPS downlink communication multiplexed with the PUSCH communication is scheduled in a same slot from which the deferred HARQ feedback for the SPS downlink communication is deferred; and transmit, to the base station, the deferred HARQ feedback for the SPS downlink communication multiplexed with the PUSCH communication.

2. The UE of claim 1, wherein the one or more processors are further configured to:

receive the SPS downlink communication; and defer HARQ feedback for the SPS downlink communication in connection with a collision between a symbol associated with the HARQ feedback for the SPS downlink communication and a configured downlink symbol, resulting in the deferred HARQ feedback for the SPS downlink communication.

3. The UE of claim 1, wherein the one or more processors, to receive the indication to multiplex the deferred HARQ feedback for the SPS downlink communication with the PUSCH communication, are configured to:

receive downlink control information (DCI) that schedules the PUSCH communication.

4. The UE of claim 3,
wherein the DCI indicates to multiplex the deferred HARQ feedback for the SPS downlink communication based at least in part on scheduling the PUSCH communication before a next available physical uplink control channel (PUCCH) communication after a symbol from which the deferred HARQ feedback for the SPS downlink communication is deferred.

5. The UE of claim 3,
wherein the indication is included in the DCI that schedules the PUSCH communication.

6. The UE of claim 5,
wherein the indication is included in a downlink assignment index field of the DCI.

7. The UE of claim 5,
wherein the indication is included in the DCI in a dedicated field for indicating multiplexing of SPS HARQ feedback with the PUSCH communication.

8. The UE of claim 3,
wherein the one or more processors, to transmit the deferred HARQ feedback for the SPS downlink communication multiplexed with the PUSCH communication, are configured to:
transmit the deferred HARQ feedback for the SPS downlink communication multiplexed with the PUSCH communication on a resource allocated for the PUSCH communication in the DCI.

9. The UE of claim 1,
wherein the indication is included in a radio resource control (RRC) configuration.

10. The UE of claim 1,
wherein the one or more processors, to transmit the deferred HARQ feedback for the SPS downlink communication multiplexed with the PUSCH communication, are configured to:
multiplex the deferred HARQ feedback for the SPS downlink communication with an earliest PUSCH communication after a symbol from which the deferred HARQ feedback for the SPS downlink communication is deferred.

11. The UE of claim 1,
wherein the indication is included in a medium access control (MAC) control element (MAC-CE).

12. The UE of claim 1,
wherein the PUSCH communication is scheduled after a next available physical uplink control channel (PUCCH) resource after a symbol from which the deferred HARQ feedback for the SPS downlink communication is deferred.

13. The UE of claim 1,
wherein the one or more processors, to transmit the deferred HARQ feedback for the SPS downlink communication multiplexed with the PUSCH communication, are configured to:
transmit the deferred HARQ feedback for the SPS downlink communication multiplexed with the PUSCH communication based at least in part on a determination that the PUSCH communication is scheduled before a next available physical uplink control channel (PUCCH) communication after a symbol from which the deferred HARQ feedback for the SPS downlink communication is deferred.

14. The UE of claim 1,
wherein the PUSCH communication is a configured grant PUSCH communication.

15. The UE of claim 14,
wherein the one or more processors, to transmit the deferred HARQ feedback for the SPS downlink communication multiplexed with the PUSCH communication, are configured to:
adjust beta factors for the configured grant PUSCH communication to multiplex the deferred HARQ feedback for the SPS downlink communication with the configured grant PUSCH communication on a resource configured for the configured grant PUSCH communication.

16. A base station for wireless communication, comprising:
memory; and
one or more processors, coupled to the memory, configured to:
transmit, to a user equipment (UE), an indication, included in a field, to multiplex a deferred hybrid automatic repeat request (HARQ) feedback for a semi-persistent scheduling (SPS) downlink communication with a physical uplink shared channel (PUSCH) communication,
wherein the field is associated with multiplexing deferred HARQ feedback, and
wherein the deferred HARQ feedback for the SPS downlink communication multiplexed with the PUSCH communication is scheduled in a same slot from which the deferred HARQ feedback for the SPS downlink communication is deferred; and
receive, from the UE, the deferred HARQ feedback for the SPS downlink communication multiplexed with the PUSCH communication.

17. The base station of claim 16,
wherein the one or more processors, to transmit the indication, are configured to:
transmit the indication to the UE based at least in part on a determination that a symbol associated with HARQ feedback for the SPS downlink communication will collide with a configured downlink symbol.

18. The base station of claim 17,
wherein the one or more processors, to transmit the indication, are configured to:
transmit the indication to the UE based at least in part on a determination that transmission of the deferred HARQ feedback for the SPS downlink communication on a next available physical uplink control channel (PUCCH) resource after the symbol associated with the HARQ feedback for the SPS downlink communication will result in a collision on the next available PUCCH resource.

19. The base station of claim 17,
wherein the one or more processors, to transmit the indication, are configured to:
transmit the indication to the UE based at least in part on a determination that the PUSCH communication is scheduled before a next available physical uplink control channel (PUCCH) resource after the symbol associated with the HARQ feedback for the SPS downlink communication.

20. The base station of claim 16,
wherein the one or more processors, to transmit the indication, are configured to:
transmit downlink control information (DCI) that schedules the PUSCH communication.

21. The base station of claim 20,
wherein the DCI indicates to multiplex the deferred HARQ feedback for the SPS downlink communication based at least in part on scheduling the PUSCH communication before a next available physical uplink control channel (PUCCH) communication after a symbol from which the deferred HARQ feedback for the SPS downlink communication is deferred.

22. The base station of claim 20, wherein the one or more processors, to receive the deferred HARQ feedback for the SPS downlink communication multiplexed with the PUSCH communication, are configured to:

receive the deferred HARQ feedback for the SPS downlink communication multiplexed with the PUSCH communication on a resource allocated for the PUSCH communication in the DCI.

23. The base station of claim 16, wherein the PUSCH communication is a configured grant PUSCH communication.

24. A method of wireless communication performed by a user equipment (UE), comprising:

receiving, from a base station, an indication, included in a field, to multiplex a deferred hybrid automatic repeat request (HARQ) feedback for a semi-persistent scheduling (SPS) downlink communication with a physical uplink shared channel (PUSCH) communication, wherein the field is associated with multiplexing deferred HARQ feedback, and wherein the deferred HARQ feedback for the SPS downlink communication multiplexed with the PUSCH communication is scheduled in a same slot from which the deferred HARQ feedback for the SPS downlink communication is deferred; and transmitting, to the base station, the deferred HARQ feedback for the SPS downlink communication multiplexed with the PUSCH communication.

25. The method of claim 24, further comprising:

receiving the SPS downlink communication; and deferring HARQ feedback for the SPS downlink communication in connection with a collision between a symbol associated with the HARQ feedback for the SPS downlink communication and a configured downlink symbol, resulting in the deferred HARQ feedback for the SPS downlink communication.

26. The method of claim 24, wherein receiving the indication to multiplex the deferred HARQ feedback for the SPS downlink communication with the PUSCH communication comprises:

receiving downlink control information (DCI) that schedules the PUSCH communication.

27. The method of claim 26, wherein the DCI indicates to multiplex the deferred HARQ feedback for the SPS downlink communication based at least in part on scheduling the PUSCH communication before a next available physical uplink control channel (PUCCH) communication after a symbol from which the deferred HARQ feedback for the SPS downlink communication is deferred.

28. The method of claim 26, wherein transmitting the deferred HARQ feedback for the SPS downlink communication multiplexed with the PUSCH communication comprises:

transmitting the deferred HARQ feedback for the SPS downlink communication multiplexed with the PUSCH communication on a resource allocated for the PUSCH communication in the DCI.

29. The method of claim 24, wherein transmitting the deferred HARQ feedback for the SPS downlink communication multiplexed with the PUSCH communication comprises:

transmitting the deferred HARQ feedback for the SPS downlink communication multiplexed with the PUSCH communication based at least in part on a determination that the PUSCH communication is scheduled before a next available physical uplink control channel (PUCCH) communication after a symbol from which the deferred HARQ feedback for the SPS downlink communication is deferred.

30. A method of wireless communication performed by a base station, comprising:

transmitting, to a user equipment (UE), an indication, included in a field, to multiplex a deferred hybrid automatic repeat request (HARQ) feedback for a semi-persistent scheduling (SPS) downlink communication with a physical uplink shared channel (PUSCH) communication, wherein the field is associated with multiplexing deferred HARQ feedback, and wherein the deferred HARQ feedback for the SPS downlink communication multiplexed with the PUSCH communication is scheduled in a same slot from which the deferred HARQ feedback for the SPS downlink communication is deferred; and receiving, from the UE, the deferred HARQ feedback for the SPS downlink communication multiplexed with the PUSCH communication.

\* \* \* \* \*